United States Patent [19]

Rateick, Jr. et al.

[11] Patent Number: 5,056,950
[45] Date of Patent: Oct. 15, 1991

[54] THERMALLY ACTIVATED JOINT

[75] Inventors: Richard G. Rateick, Jr.; Douglas A. Hall, both of South Bend, Ind.

[73] Assignee: Allied-Signal Inc, Morristown, N.J.

[21] Appl. No.: 576,560

[22] Filed: Aug. 31, 1990

[51] Int. Cl.$^5$ .............................................. F16D 1/00
[52] U.S. Cl. ...................................... 403/24; 403/28; 403/341
[58] Field of Search ....................... 403/30, 28, 29, 24, 403/341

[56] References Cited

U.S. PATENT DOCUMENTS

| | | | |
|---|---|---|---|
| 4,632,590 | 12/1986 | Tsuchimoto | 403/30 |
| 4,690,617 | 9/1987 | Oda et al. | 403/30 X |
| 4,777,844 | 10/1988 | DeBell et al. | 403/28 X |

Primary Examiner—Andrew V. Kundrat
Attorney, Agent, or Firm—Leo H. McCormick, Jr.; Ken C. Decker

[57] ABSTRACT

A connection for establishing a joint between materials having different coefficient of thermal expansion. The connection has a first and second members made from materials that have different coefficient of thermal expansion. The first member has a cylindrical end with a bore therein and a rib located on the peripheral surface of the cylindrical end. The second member has a first diameter section located in the bore of said first member and a second diameter section. A sleeve which surrounds a portion of the cylindrical end of the first member and the second diameter section of the second member has a groove for receiving the rib on the first member. Bolts extend through the sleeve into the second diameter section to establish an external compressive force between the sleeve and the rib to hold the first member and the second member in a fixed relationship and form a unitary structure. The first and second members responding to the differences in coefficient of thermal expansion with a reduction in said external compressive force while the first diameter section of the second member expands to create an internal radial force which acts on the portion of the first cylindrical member surrounding the bore to maintain the space relationship of the first and second members with changes in temperature.

11 Claims, 2 Drawing Sheets

THERMALLY ACTIVATED JOINT

This invention relates to a connection for joining materials of different coefficient of thermal expansion in a manner to maintain the substantially same space relationship between the materials with changes in temperature.

A common limitation of all high temperature control valves designed to operate at temperatures that reach 2000° F. resides in the actuation systems and associated electronic which cannot withstand temperatures above 400° F. for any sustained period of time. This limitation is usually overcome through the use of a thermally resistive and structurally supportive standoff apparatus which is located between the valve body and the actuation system. The standoff apparatus has a joint that is made of thermal resistive materials that do not deform or transfer temperature which would damage components in the actuation system.

In a known joining device, a metallic shaft is attached to a ceramic turbocharger rotor through a shrink fit connection. While this type of joining device adequately functions in a service range wherein the environmental temperatures may reach 2000° F. at temperatures below 400° F. unacceptable compressive stress forces are introduced into the ceramic member. In addition, once the metallic shaft is attached to the turbocharger rotor the shaft cannot be removed without damaging the shaft and rotor.

In another joining device, a metallic member is connected to a ceramic member through an external collet. Unfortunately, this type joining device also has a limitation with respect to the development of high stress in the ceramic member at low temperatures. The external collet, metallic and ceramic members are in constant contact during high temperature operation. The high temperature operation may result in the development of an oxide layer bond between the components. Should it later be desirable to disassemble the components, the oxide layer bond is broken and may result in some damage to both components. Also, high stresses in the metallic member parts may causes creep to occur in the operating range of this type joining device, resulting in a reduction in clamping load.

To overcome the low temperature stress limitation of the external collet type joining devices, an internal collet connection for a joining was suggested. However, on investigation of such a joining device, its complexity resulted in a two-fold increase in the outside diameter of the connection and a corresponding increases in the weight of the connection.

In addition, it was also suggested that a flange type connection may be acceptable for use as a high temperature joining device. Further investigation indicated that creep of metal fasteners caused by long term exposure to high temperature could result in loosening the joint and alternatively if only ceramic fasteners were used there would be a substantial increase in the complexity of the joining device to achieve sufficient strength.

In order to overcome the stress limitations of the known joining devices, we have developed a demountable connection for joining members with dissimilar coefficients of thermal expansion wherein the stress caused by such differences is substantially reduced to a level that would not damage the components. In this invention, a first shaft made of a ceramic material has a cylindrical section with a bore therein and a rib formed on the cylindrical section, a second shaft made of a metallic material has a first diameter section that extends into the bore, the first diameter section is separated from a second diameter section by a shoulder, a clamp which has a groove for receiving the rib surrounds the second diameter section and a fastener attaches the clamp to the second diameter section. At low temperature, the compressive force of the clamp acting on the ceramic member maintains the space relationship between the first and second shafts. As the temperature increases, the metallic clamp expands at a different rate than the ceramic material in the first shaft and as a result the external compressive force created by the attachment of the clamp to the second diameter section is proportionally reduced, however, at the same time the first diameter section of the second shaft expands to engage the interior of the bore and create a radial force to maintain the space relationship of the first and second shafts as the temperature increases. The first diameter section of the second shaft has a series of grooves located thereon which decrease the average stress in the first diameter as the connection is exposed to higher temperatures to assure that the first shaft is not axially separated from the second shaft.

An advantage of the present invention resides in the simple joint that connects a ceramic member with a metallic member to allow torsional and axial inputs from a relatively low temperature environment to be transmitted to a high temperature environment without a substantial change in the structural unity of the joint.

An object of this invention is to provide a connector with means to compensate for changes in the coefficient of thermal expansion to maintain the space relationship between a ceramic member and a metallic member with changes in temperature.

A still further object of this invention is to provide a metallic and ceramic connection with the means of maintaining the space relationship with respect to each other as the environmental temperature changes to compensate for a reduction in a initial compressive force by the development of an outward radial force with changes in temperature.

These advantages and objects should be evident from reading this specification while viewing the drawings where:

Figure 1:
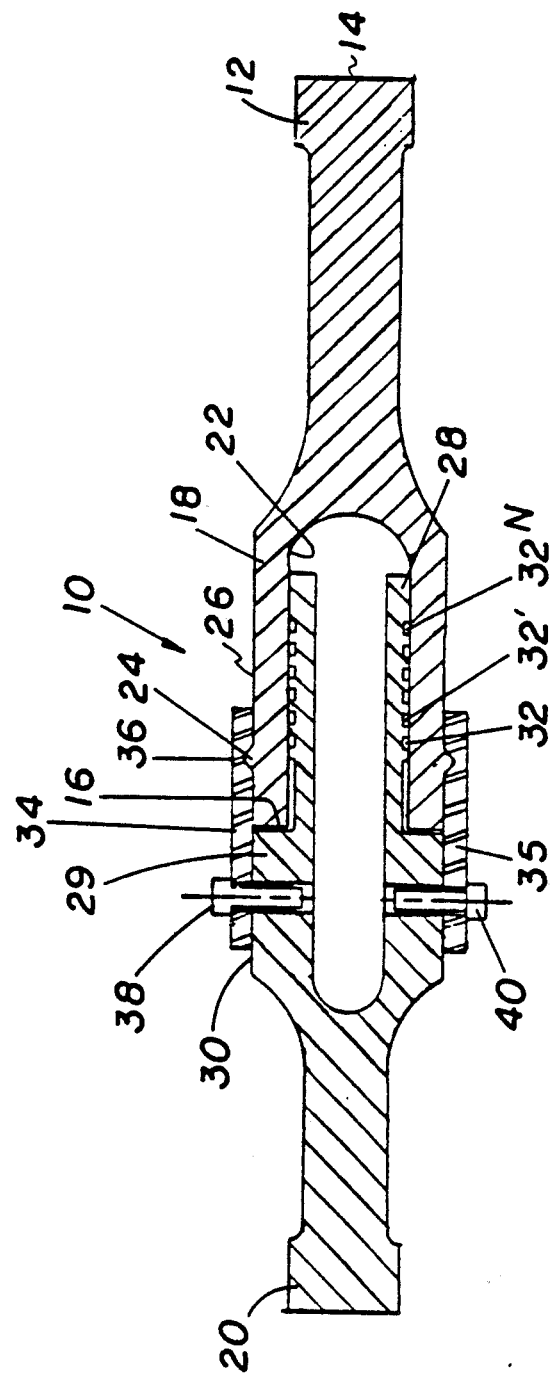
FIG. 1 is a sectional view of a connection for joining a ceramic shaft to a metallic shaft according to the principles of the invention disclosed herein.

The connection 10 shown in FIG. 1 has a ceramic member or shaft 12 connected to a metallic member or shaft 20.

The ceramic member or shaft 12 has first end 14 and a second end 16. The ceramic member 12 is made of a silicon mitride material which is designed to have the capability to be connected to a valve whose operating temperature may reach 2000° F. While the length of the shaft 12 may allow for some cooling in the environment in which it is located more often, the temperature at the second end 16 connected to a metallic member or shaft 20 may approach that of the first end 14 connected to the valve. The second end 16 has a cylindrical body 18 with a bore 22 located therein. A rib 24 is located on the peripheral surface 26 of the cylindrical body 18 adjacent the second end 16.

The metallic member or shaft 20 has a first diameter section 28 which extends into bore 22 and a second diameter section 30. The shaft 20 is made from a high strength steel such as Hastelloy-X which has a coefficient of thermal expansion of 8.6×10 inches per degree Fahrenheit from 70° F. to 1200° F.

Clamp or sleeve means is also made of the same high strength steel as shaft and is made of two parts each of which comprise semi-cylindrical members 34 and 35 that have a groove 36 which receive rib 24 on the peripheral section 26 of ceramic shaft 12.

Bolts 38 and 40 extend through semi-cylindrical members 34 and 35 into threads on the second diameter section 30 of shaft 20 to position the second end 16 adjacent shoulder 29. Some clearance is designed between end 16 and shoulder 29 while the internal clearance between the first diameter section 28 and bore 22 is nominally 0.0025 but may vary from 0 to 0.003 inches. If the internal clearance is outside the range the resulting radial force may never develop as intended with temperature changes. Since the internal clearance must be maintained within certain limits, the difference in the coefficient of thermal expansion of the materials must be selected to achieve the desired change with changes in temperature. The actual physical dimensions of the components is critical, if the components are too small the thermal expansion while it does occur may not produce the desired results. We have found that this invention achieves best results when the components have an actual dimension of one inch or larger. In order to modify the stress distribution in the metallic shaft 20, a plurality of grooves 32, 32'. . . $32^N$ are located on the first diameter section 28. The grooves 32, 32'. . . $32^N$ allow the first diameter section 28 to deform with high temperature elongation and thereby the radial force produced is modified.

In order to evaluate the connection 10, the temperature of the connection 10 was progressively evaluated with respect to increasing temperatures. Ceramic shaft 12 was evaluated at temperatures corresponding to the operating range of a high temperature valve while the metallic shaft 20 was evaluated at temperatures corresponding to a safe temperature for electronic components. Initially, the compressive force of the semi-cylindrical members 34 and 35 acting on the ceramic rib provide a joining force which holds the metallic shaft 20 to the ceramic shaft 12. As the temperature increases, the coefficient of thermal expansion between the ceramic shaft 12, metallic shaft 20 and clamp means causes the compressive force acting on the rib 24 to decrease, however, the radial expansion component of the first diameter section 28 reacting to changes in temperature creates a corresponding radial force that acts against that portion of the ceramic member surrounding the bore 22 to hold that second end 16 in substantially the same space relationship with respect to shoulder 29 and thereby maintain the unity of the connection even as shafts 12 and 20 are exposed to high temperature.

Figure 2:
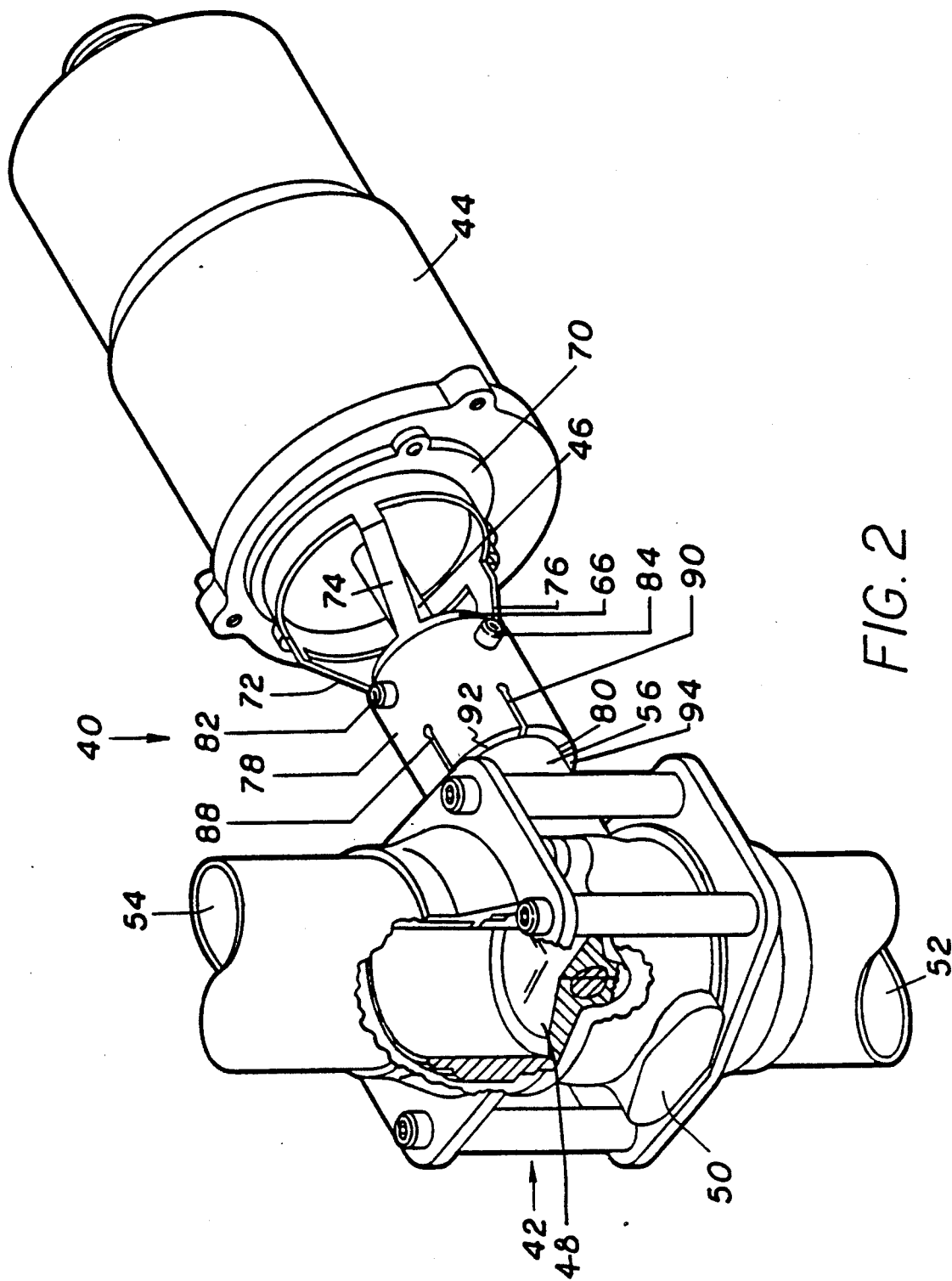
FIG. 2 is a perspective view of a valve and actuator separated by a standoff apparatus made according to the present invention.
Figure 3:
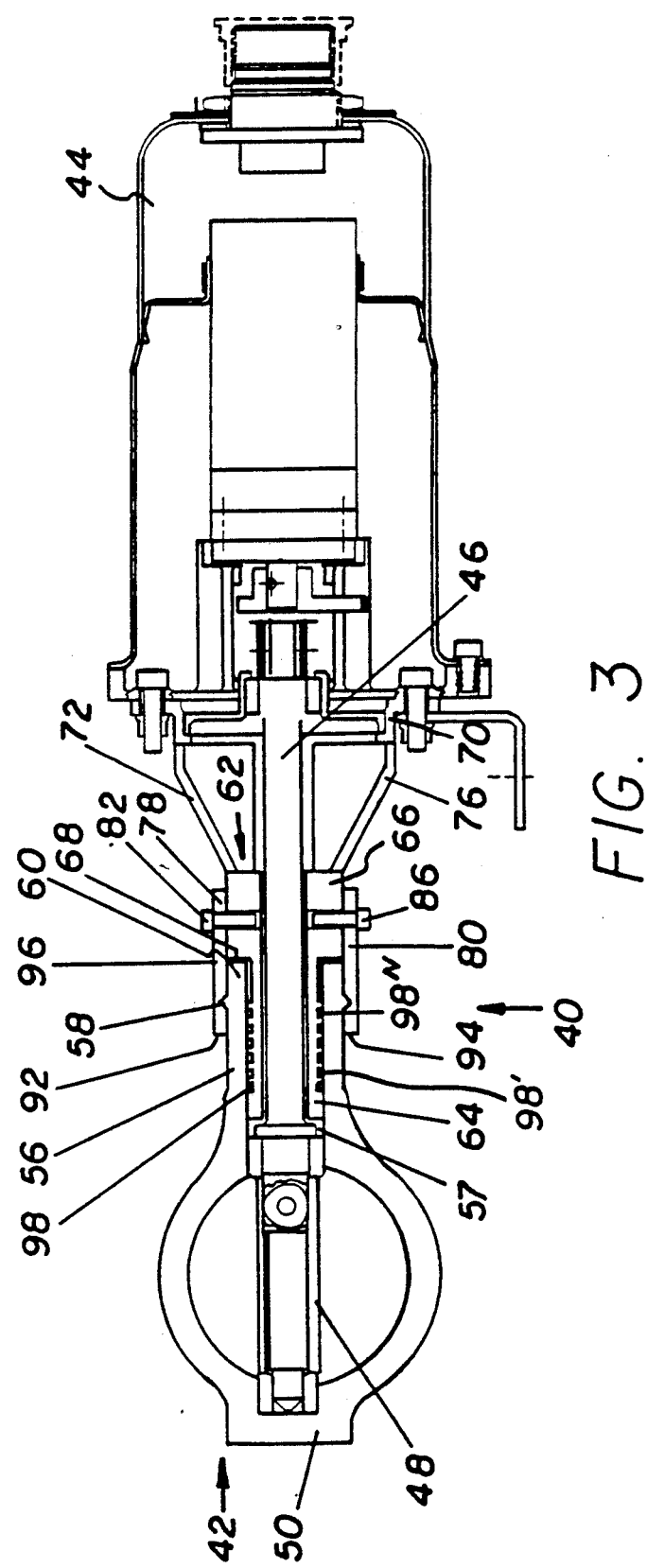
FIG. 3 is a sectional view of the valve, standoff apparatus and actuator of FIG. 2.

In order to evaluate the connection 10 in an operational environment, a connection 40, as seen in FIGS. 2 and 3, was developed. Connection 40 is designed to be used as a standoff 40 between a valve 42 and an actuator assembly 44. The actuator assembly 44 is designed to retain electronics and a stepper motor for providing a shaft 46 with an input to rotate a butterfly valve in housing 50. Housing 50 has an inlet port 52 and an outlet port 54 which supplies a fluid that can reach 2000° F. to a system. Housing 50 is made of a ceramic material and has a projection 56 with a rib 58 located adjacent the end 60 thereof.

A metallic member 62 was made from a high temperature steel, Hastelloy-X. Metallic member 62 has a first diameter section 64 located in bore 57 of projection 56, a second diameter section 66 separated from the first diameter section 64 by a shoulder 68 and a base 70 connected to the second diameter section 66 by a series of fingers 72, 74, 76. Semi-cylindrical clamps 78 and 80 are attached to the second diameter section 66 by a series of self-locking bolts 82, 84, 86, and etc. The semi-cylindrical clamps 78 and 80 each have at least slots 88 and 90 that extends from face 92 and 94 past groove 96 which receives the rib 58 on the ceramic projection 56. The material in the clamps 78 and 80 acts as a spring to engage and provide a compressive force to hold metallic member 62 to the ceramic projection 56. The first diameter section 64 has a series of grooves 98, 98'. . . $98^N$ which modify the stress distribution of the metallic member 62 to maintain the clearance between shoulder 68 and end 60 on the ceramic member 50 and reduce the tensile stress in the ceramic member with temperature changes.

In operation, the valve 42 is exposed to temperatures up to 2000° F. while the actuator 44 must be maintained at a temperature below 400° F. Initially, the external compressive force from the clamps 78 and 80 act on the rib 58 to join the metallic member 62 with the ceramic member 50. As the temperature increases, coefficient of thermal expansion in clamps 78 and 80 caused a reduction in the external compressive force, however, the same coefficient of expansion causes the first diameter section 64 to expand and provide a radial force that acts on the ceramic projection 56 to maintain the structural unity of the connection 40 as the exposure temperature reaches the maximum operating temperatures for the valve 42 and actuator 44.

We claim:

1. Connection means for joining an a valve, said valve operating over a temperature range of −200° F. to 2000° F. while the operating range of said actuator should be maintained below 400° F., said connection comprising:

a projection extending from said valve, said projection being made of a ceramic material and having a blind axial bore, said projection having an annular rib located on its peripheral surface in the area of said blind axial bore;

a cylindrical body made of a metallic material and having a first diameter section separated from a second diameter section by a shoulder and legs connecting said second diameter section to a base attached to said actuator, said first diameter section extending into said axial bore of said projection;

a clamp surrounding said second diameter section of said second cylindrical body and a portion of said projection; and means for attaching said clamp to said second diameter section to provide an external compressive force on said annular rib to hold said projection and cylindrical body together and form a unitary structure, said projection and cylindrical body responding to changes of temperature by expanding at different rates, said first diameter section of said cylindrical body expanding as the temperature increases to create an internal radial force on said projection to maintain the space relationship between said projection and cylindrical body as the operating temperature of the valve increases and the external compressive force is correspondingly reduced.

2. The connection means as recited in claim 1 wherein said cylindrical body further includes;
a series of grooves located on the peripheral surface of said first diameter surface, said grooves modifying the stress distribution of said first diameter section as the environmental temperature of the connection means increases, said modification limiting the internal radial force applied to the projection.

3. The connection means as recited in claim 2 wherein said means for attaching includes:
a plurality of self-locking bolts that extend through said sleeve and engage said second diameter section of said cylindrical body.

4. The connection means as recited in claim 3 wherein said clamp includes:
a first and second semi-circular members each of which have a groove for receiving said annular rib on said projection, said groove retaining said annular rib to establish said space relationship between said projection and cylindrical body.

5. The connection means as recited in claim 4 wherein each of said semi-circular members have a plurality of axial slots that extend from an end thereof past said groove to define a plurality of resilient members that engage the rib on the projection.

6. Connection means for establishing a joint between a ceramic member exposed to an environment where the temperature may reach 2000° F. and a metallic member exposed to an environment where the temperature must not exceed 400° F., said connection means comprising:
a first shaft having a cylindrical end with a bore therein, said cylindrical end having a rib located on its peripheral surface, said first shaft being made of a ceramic material that has a first coefficient of expansion with respect to temperature;
a second shaft having a cylindrical end with a first diameter surface located in said bore of said first shaft and a second diameter surface, said second shaft being made of a metallic material that has a second coefficient of expansion with respect to temperature;
a sleeve surrounding a portion of said cylindrical end of said first shaft and said second diameter surface of said second shaft, said sleeve having a groove for receiving said rib on said first shaft; and
means for securing said sleeve to said second diameter to establish an external compressive force between said sleeve and said rib to hold the first shaft and the second shaft in a fixed relationship to form a unitary structure, said first and second shafts responding to differences in coefficient of expansion with a reduction in said external compressive force while the first diameter surface of said second shaft expands to create an internal radial force which acts on the portion of said first cylindrical body surrounding said bore to maintain the space relationship of the first and second shafts with changes in temperature.

7. The connection as recited in claim 6 wherein said second shaft further includes:
a series of grooves located on said first diameter section, said grooves modifying the stress distribution in the first diameter section to maintain the space relationship of first and second shafts as the temperature increases.

8. The connection as recited in claim 7 wherein said sleeve includes:
a plurality of axial slots that extend from the end of the sleeve on that portion that is adapted to surround said cylindrical body of said first shaft to form a plurality of resilient fingers that engage the first shaft.

9. Connection means for establishing a joint between materials having different coefficient of thermal expansion, said connection means comprising:
a first member having a cylindrical end with a bore therein, said cylindrical end having a rib located on its peripheral surface, said first member being made of a first material that has a first coefficient of thermal expansion;
a second member having a cylindrical end with a first diameter section located in said bore of said first member and a second diameter section, said second member being made of a second material that has a second coefficient of thermal expansion;
a sleeve surrounding a portion of said cylindrical end of said first member and said second diameter section of said second member, said sleeve having a groove for receiving said rib on said first member; and
means for securing said sleeve to said second diameter section to establish an external compressive force between said sleeve and said rib to hold the first member and the second member in a fixed relationship to form a unitary structure, said first and second members responding to the differences in coefficient of expansion with a reduction in said external compressive force while the first diameter section of said second member expands to create an internal radial force which acts on the portion of said first cylindrical member surrounding said bore to maintain the space relationship of the first and second members with changes in temperature.

10. The connection as recited in claim 9 wherein said second member further includes:
a series of grooves located on said first diameter section, said grooves modifying the stress distribution in the first diameter section to maintain the space relationship of first and second members as the temperature increases.

11. The connection as recited in claim 10 wherein said sleeve includes:
a plurality of axial slots that extend from the end of the sleeve on that portion that is adapted to surround said cylindrical section of said first member to form a plurality of resilient fingers that engage the first member.

* * * * *